Nov. 20, 1928.
J. E. STEFFENS
MANTLE FOR GAS BURNERS
Filed Dec. 13, 1927
1,692,000
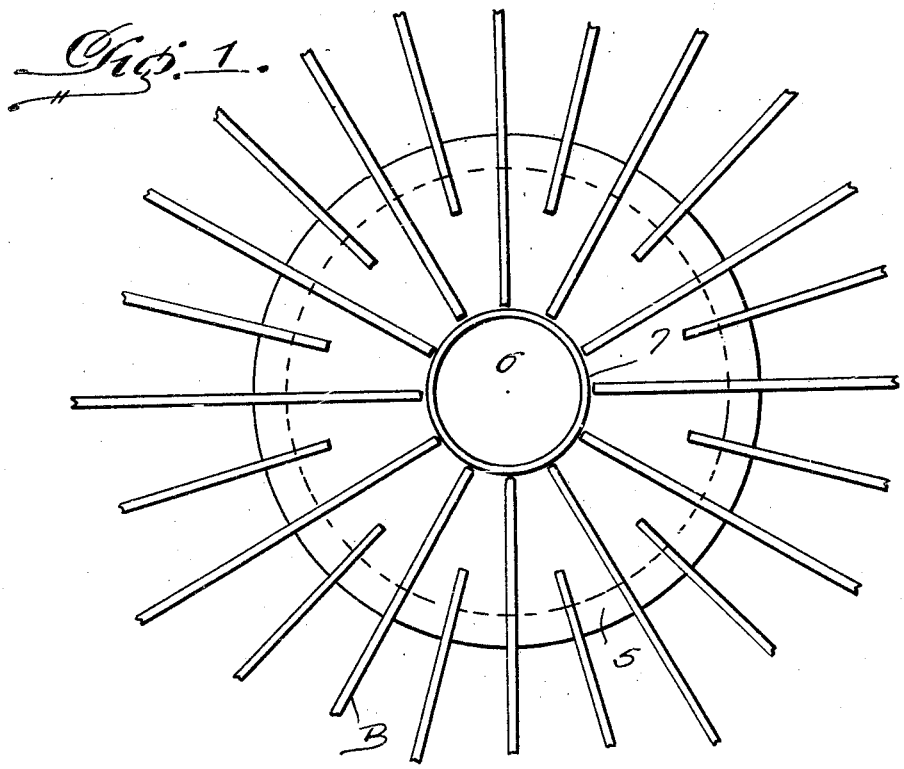
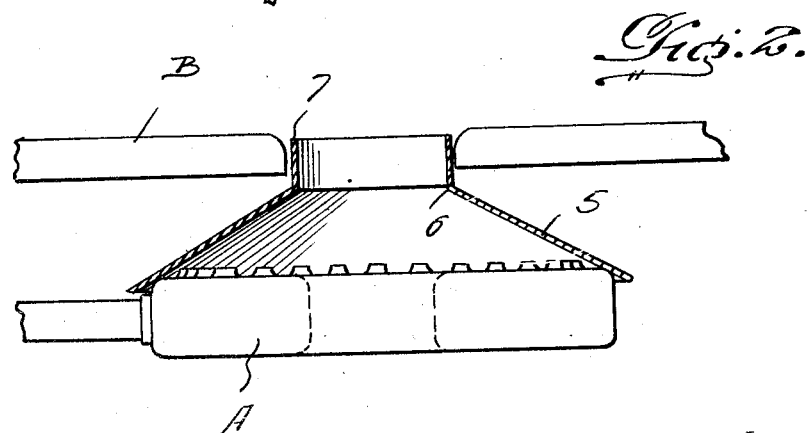
Inventor
J. E. Steffens,
By Clarence A. O'Brien
Attorney Patented Nov. 20, 1928.

1,692,000

UNITED STATES PATENT OFFICE.

JOSEPH E. STEFFENS, OF HOLLIS, NEW YORK.

MANTLE FOR GAS BURNERS.

Application filed December 13, 1927. Serial No. 239,712.

This invention relates to new and useful improvements in mantles for gas burners, and aims to provide a device especially adapted for use in conjunction with gas burners employed for heating purposes, which mantle so surrounds the burner as to direct the heat therefrom in concentrated form in an upward direction so that the fronts or pans disposed above the burner will receive the full force of the heat generated thereby.

A further and important object is to provide a mantle that will so cover the burner as to prevent fluid that overflows pots and pans from falling upon the burner resulting in the clogging of the gas openings and the frequent extinguishing of the burner.

In the drawing wherein like reference characters indicate corresponding parts in both of the views:

Figure 1 is a plan view disclosing fragmentarily a conventional grille of a gas stove burner, the present mantle being arranged over the burner.

Figure 2 is a side elevation of a burner, the mantle being arranged thereon and being disclosed in cross section.

Now having particular reference to the drawing, A in Figure 2 designates a generally conventional gas burner arranged over which and in spaced relation therewith is the usual pan supporting grating B. My invention per se consists of an inverted frusto-conical pan shape mantle 5 of an area sufficient to enable the larger edge to overlie the edge of the burner upon the top side thereof. At the reduced end of this mantle the same is formed with an opening 6 projecting upwardly from the edge of which is a flange 7 adapted for engagement through the usual opening in the grating B for limiting movement of the mantle upon the burner.

This mantle may be constructed of any suitable metal such as cast iron, plate tin, steel or the like, and obviously the flame from the burner A will be centralized within the mantle so that the heat generated thereby will pass upwardly through the opening at the apex of the mantle and be directed fully against the center of the pot or pan supported upon the grating B. Furthermore, insomuch as the mantle 5 overlies the burner tip, any fluid or other matter falling from pots or pans supported upon the grating will fall upon the mantle 5 and be deflected from the burner with the obvious result that the burner will be maintained clean and be prevented from becoming extinguished.

Having thus described the invention, what I claim as new and desire to secure by Letters Patent is:—

In a mantle for gas burners wherein a pan supporting grating is arrange above the burner and wherein said grating is formed centrally with an opening, an inverted frusto-conical member adapted for disposition upon the burner, the edge thereof surrounding the edge of the burner, the reduced end of the member being formed with an opening, and a cylindrical flange extending upwardly from the edge of the opening for engagement within the opening of said grating.

In testimony whereof I affix my signature.

JOSEPH E. STEFFENS.